United States Patent [19]

Slindee

[11] 4,040,105
[45] Aug. 2, 1977

[54] MAGNETIC DISK DRIVE UNIT WITH FLEXIBLE SKIRT

[75] Inventor: Norman Edward Slindee, Austin, Minn.

[73] Assignee: International Business Machines Corporation, Armonk, N.Y.

[21] Appl. No.: 615,944

[22] Filed: Sept. 23, 1975

[51] Int. Cl.² ............... G11B 5/016; G11B 23/02; H05F 3/00
[52] U.S. Cl. ............... 360/99; 206/444; 360/133; 361/220
[58] Field of Search ............ 360/99, 133, 86, 97; 206/444, 313; 317/2 R, 2 A, 2 B, 2 C, 2 F; 274/47

[56] References Cited

U.S. PATENT DOCUMENTS

| 3,532,932 | 10/1970 | Simon | 317/2 R |
|---|---|---|---|
| 3,815,150 | 6/1974 | Stoddard et al. | 360/99 |
| 3,864,755 | 2/1975 | Hargis | 360/99 |
| 3,899,181 | 8/1975 | Dannert | 360/133 |
| 3,904,929 | 9/1975 | Kanaya | 317/2 F |
| 3,931,644 | 1/1976 | Ward | 360/99 |
| 3,932,710 | 1/1976 | Dickopp | 360/99 |

OTHER PUBLICATIONS

Handbook of Physics, McGraw-Hill Book Company, Inc., pp. 4–8, 4–9, 4–10, 11, and 4–141.

*Primary Examiner*—Alfred H. Eddleman
*Attorney, Agent, or Firm*—Keith T. Bleuer

[57] ABSTRACT

A magnetic disk drive unit or machine adapted to receive disk-jacket assemblies for magnetically reading from and writing on a disk in such an assembly. The jacket of the assembly is made of a material with high electrical resistance which accumulates static electricity through usual handling. The machine includes a skirt having an electrically conducting layer thereon and hung on an upper portion of the machine so that the skirt is in contact with an outer surface of the jacket for draining off an electrostatic charge accumulation on the jacket very quickly.

4 Claims, 9 Drawing Figures

4,040,105

MAGNETIC DISK DRIVE UNIT WITH FLEXIBLE SKIRT

CROSS REFERENCE TO RELATED APPLICATION

This application is related to an application by Coy L. Huffine, Larry F. Mattson, Karl A. Shidler and Norman E. Slindee for "Anti-Static Magnetic Record Disk Assembly", Ser. No. 615,943, filed Sept. 23, 1975.

BACKGROUND OF THE INVENTION

The invention relates to magnetic disk drive units or machines of type adapted to accommodate disk-jacket assemblies, and more particularly the invention relates to mechanism for draining off accumulations of static electricity carried by the jacket of such an assembly.

Magnetic disk-jacket assemblies have been previously proposed as, for example, in U.S. Pat. No. 3,668,658 issued June 6, 1972 to Ralph Flores et al. In addition, machines for accommodating such disk-jacket assemblies have been previously proposed, such as for example in U.S. Pat. No. 3,846,836 issued on Nov. 5, 1974 to Philip R. Masse et al. It has been found that if the jacket of such a disk-jacket as is described in U.S. Pat. No. 3,668,658 is formed of a material having high electrical resistance, such as polyvinyl chloride acetate, such jackets accumulate electrical charges which cause spurious signals to be applied to a transducer in electrical energy transferring relationship with respect to the disk. Such a type of high electrical resistive material is particularly suitable for use with such jackets due to high impact resistance, the ability to heat seal the parts thereof together, etc. The problem has been found particularly acute when transducers composed mainly of electrical insulating material are used, and such transducers have been found particularly desirable due to their low cost, better electrical response, etc.

SUMMARY OF THE INVENTION

It is an object of the present invention to provide improved mechanism in such a disk drive machine which functions to drain off the static electricity accumulated on the jacket of such a disk-jacket assembly.

I have found that such a static accumulation on a disk-jacket assembly may be drained off by providing a flexible skirt depending downwardly into the recess of the machine in which the disk-jacket assembly is moved for putting it into proper relationship for writing on or reading by using the magnetic transducer of the machine. The flexible skirt has a layer of electrical conducting material on it which may either be in direct contact with the jacket or may be spaced by the thickness of the skirt from the jacket, and this conductive layer drains off the electrostatic charge accumulated on the jacket.

DESCRIPTION OF THE PREFERRED EMBODIMENT

Figure 1:
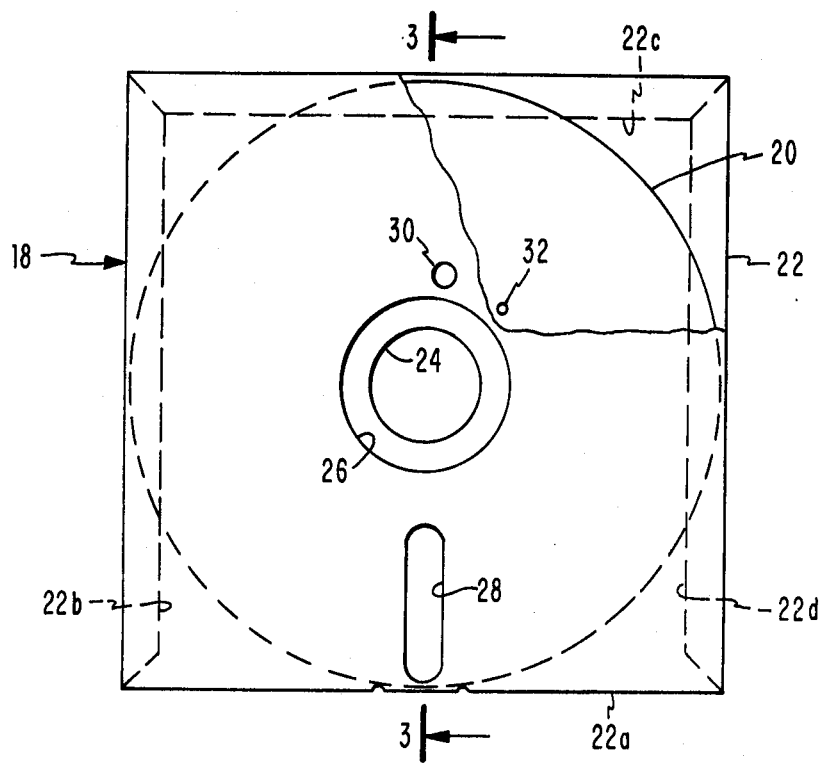
FIG. 1 is a plan view of a magnetic record disk assembly including a rotatable disk disposed in a jacket of high electrical insulating material.
Figure 3:
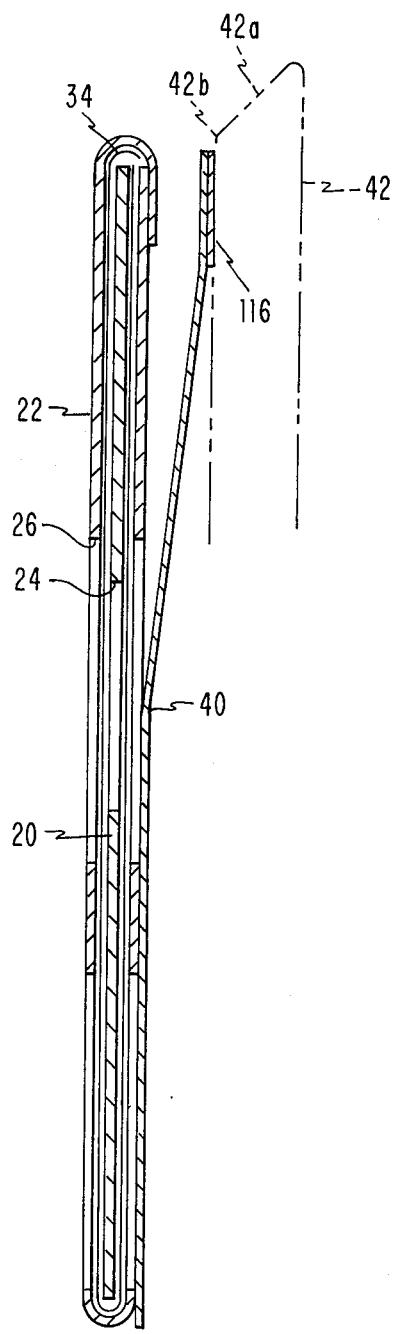
FIG. 3 is an exploded view of the disk assembly and the antistatic skirt of the invention hanging suspended in a disk drive machine in which the disk assembly may be used, the view being taken on line 3—3 of FIG. 1 and showing the disk drive machine only partially.

The disk assembly 18 shown in FIGS. 1 and 3 may be seen to comprise a magnetic disk 20 disposed within a square jacket 22. The disk 20 is of a thin, flexible material, such as polyethylene terephthalate (Mylar) of about 0.003 inch thickness; and the disk 20 has an unoriented $Fe_2O_3$ coating on both sides. The jacket 22 may be of a more rigid but still somewhat flexible vinyl sheet material, such as polyvinyl chloride, or more preferably polyvinyl chloride acetate, of 0.010 inch thickness, for example. Both magnetic disk 20 and the jacket 22 are thus of electrically nonconductive material. The disk 20 has a central opening 24, and the jacket 22 has larger central openings 26 in its two thicknesses. In addition, the jacket 22 has aligned radial slots 28 and aligned round openings 30 in its two thicknesses. The openings 30 are adapted to align with an opening 32 in the disk 20 as the disk rotates within the jacket 22.

A layer 34 (see FIG. 3) of a porous, low friction, antistatic material is disposed between the disk 20 and the inner surface of the jacket 22. A particular material suitable for this purpose may be the dusting fabric which is manufactured by Minnesota Mining and Manufacturing Company and is designated 3M550, generally known in the art as "pink wipe". The functioning of such a wipe in a disk assembly as so far described herein is set forth in U.S. Pat. No. 3,668,658, issued June 6, 1972, which may be also referred to for additional details of such a disk assembly.

The jacket 22 may constitute a single piece of polyvinyl chloride acetate having two halves folded together to form a lower edge 22a, and the jacket 22 is provided with flaps 22b, 22c and 22d which are bent over and are bonded on one outer surface of the assembly 18 in order to form a closed structure for the disk 20.

Figure 2:
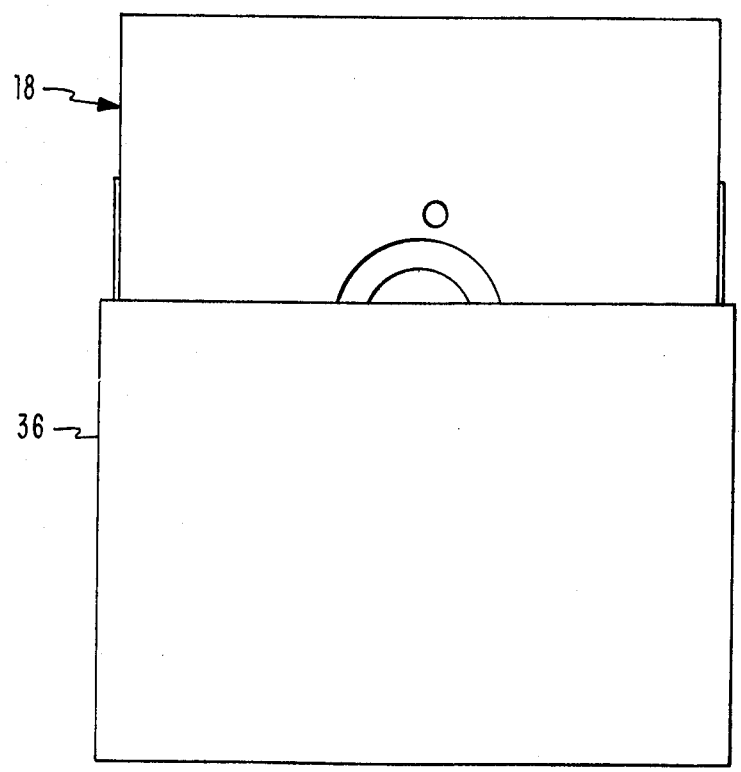
FIG. 2 is a plan view of the record disk assembly showing the assembly being inserted into a protective envelope therefor.

The assembly 18 is adapted to be stored in a protective envelope 36 which is shown in FIG. 2. The assembly 18 in being slid into and out of an envelope 36 may be expected to accumulate a static charge, apparently on its outer surface; and this charge causes difficulty in magnetically reading from a surface of the disk 20 unless certain measures are taken, such as by using the structures of the invention. The static charge may also be accumulated on the jacket 22 without using the protective envelope 36, such as simply by carrying the assembly 18 in a person's hand as he moves across a floor carpet. The charge on the jacket 22, in fact, is difficult to avoid and varies in potential depending on the hunidity in which the assembly 18 exists and is undoubtedly due in part to the highly nonconductive nature of the polyvinyl chloride acetate of which the jacket 22 is preferably composed.

Figure 8:
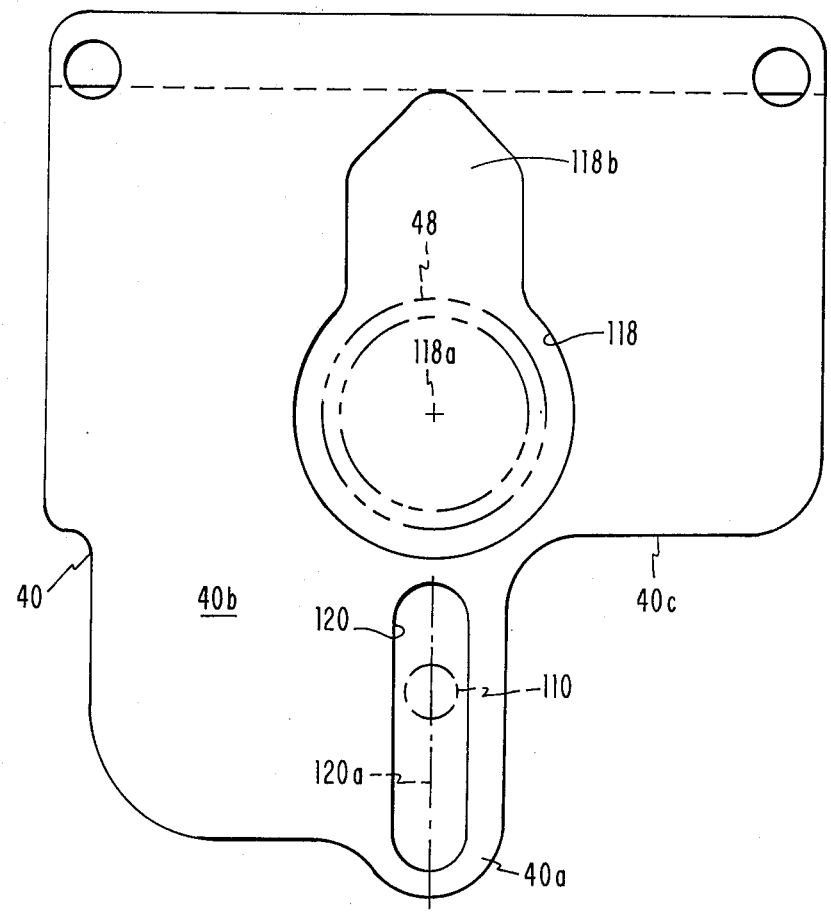
FIG. 8 is a plan view of the antistatic skirt.
Figure 9:
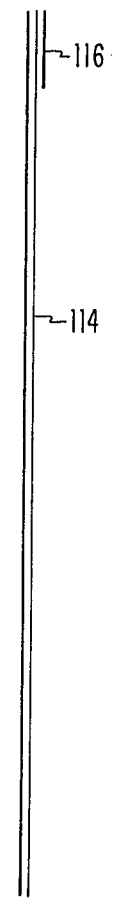
FIG. 9 is an exploded side view of the skirt.

The invention lies in a machine for magnetically reading from the disk 20 and more particularly constitutes the skirt 40 shown in FIGS. 3, 8 and 9 installed in the machine which has been found to overcome the effects of static electricity carried by the jacket 22.

Figure 5:
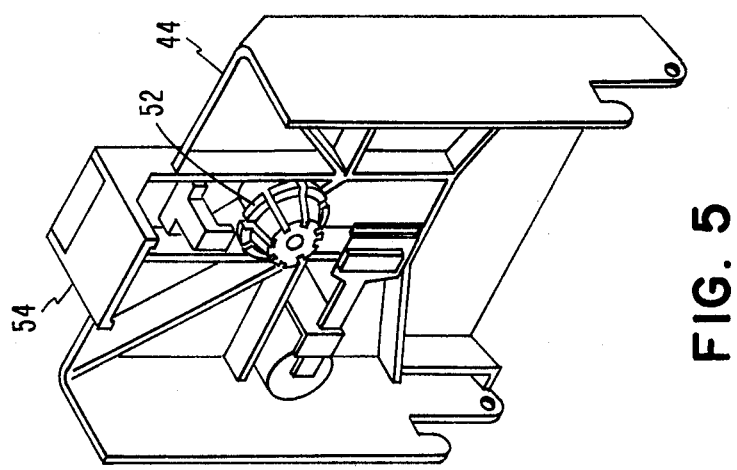
FIG. 5 is a perspective view of the cover of the disk drive machine.
Figure 4:
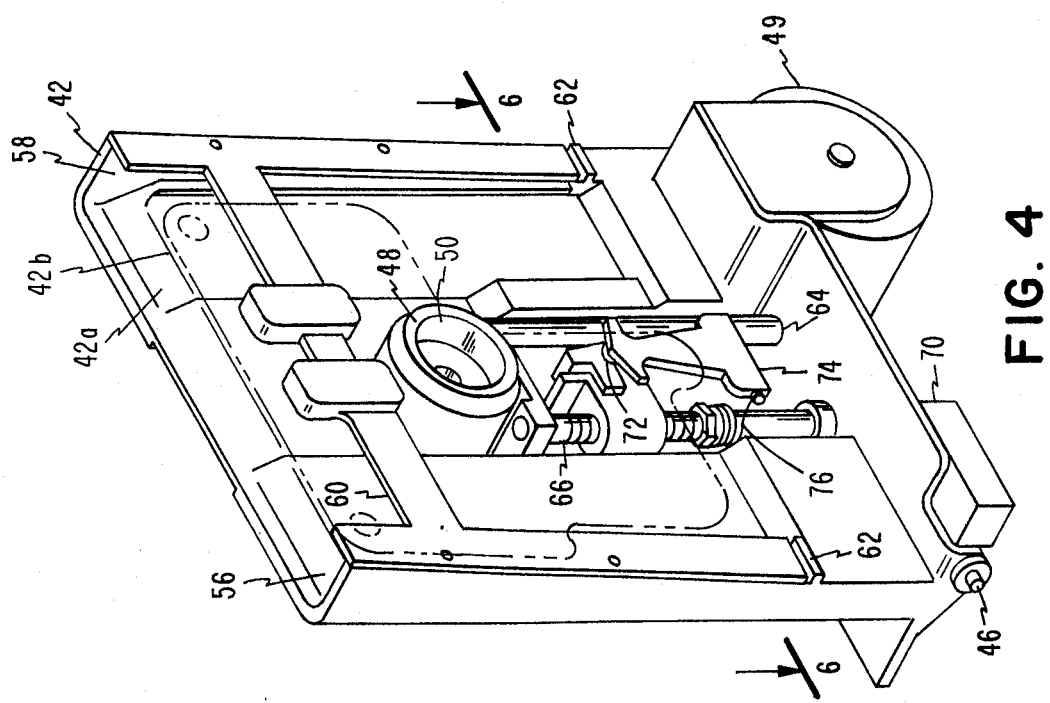
FIG. 4 is a perspective view of the frame of the disk drive machine with which the disk assembly may be used.

The machine is made up of a vertical disk assembly support or frame 42 and a cover 44 which is hingedly mounted on the frame 42 by means of studs 46 (see FIGS. 4 and 5). A metal hub 48 is rotatably disposed in the frame 42 and is driven from a drive motor 49 by any suitable drive mechanism, such as a belt and pulleys (not shown). The hub 48 has a countersunk opening 50 for purposes to be described.

The cover 44 has a tapered collet or arbor 52 (which may be made of plastic) rotatably mounted in it, and the collet 52 is so shaped and located that it fits in the opening 50 when the cover 44 is moved toward or closed with respect to the frame 42. The collet 52 extends through the opening 24 in the disk 20, and the disk 20 is thus clamped between the hub 48 and the collet 52 to be rotatably driven when the disk assembly 18 is properly located in the machine. The cover 44 may be held in place with respect to the frame 42 by any suitable latch 54 so that the disk 20 is gripped between the collet 52 and the hub 48.

The frame 42 is provided with a pair of opposite vertical tapered slots 56 and 58 with sides of the slots 56 and 58 being formed by an H-shaped auxiliary support 60 which is screwed onto the frame 42 as shown in FIG. 4. The inner surfaces of the frame 42 and support 60 together with the slots 56 and 58 form a recess into which the disk assembly may be moved. The disk assembly 18 is simply moved downwardly into the slots 56 and 58 to bring the central disk opening 24 into alignment with the countersunk opening 50 prior to a closing of the cover 44, and a pair of abutments 62 are provided at the bottoms of the slots 56 and 58 for holding the assembly 18 properly positioned in the frame 42.

The frame 42 has a slide rod 64 fixed within it and has a lead screw 66 rotatably disposed in it opposite the rod 64. A slider 68 is slideably disposed on the rod 64 and has a threaded connection with the screw 66. An electric motor 70, preferably of the electrical stepping type, is fixed on the bottom of the support 42 and is driveably connected with the screw 66 so as to move the slider 68 longitudinally along the slide rod 64. The slider 68 carries an electrical transducer 72 (see FIGS. 4, 6 and 7), and a pressure arm 74 is swingably mounted on the slider 68 and has a protruding portion adapted to enter into one of the elongate slots 28 in the assembly 18 for forcing the disk 20 against the transducer 72. A spring 76 provides force on the arm 72 for this purpose.

An electromagnet 78 (see FIG. 6) is provided for swinging the arm 74 with respect to the transducer 72. The electromagnet has a core 80, and an armature 82 moves toward and away from the core 80. The armature 82 is in the form of a lever which is fulcrumed in an opening 84 in a standard 86 that is fixed with respect to the cover 44 by means of another standard 88 screwed onto the cover 44. A spring 90 is provided between the standard 88 and the lever 82. A lever extension 92 of relatively thin flexible material is fixed at its base end to the lever 82, and an adjustment screw 94 extends through the distal end of the lever 82 and is in contact with the lever extension 92 for adjusting extension 92 with respect to lever 82.

Figure 6:
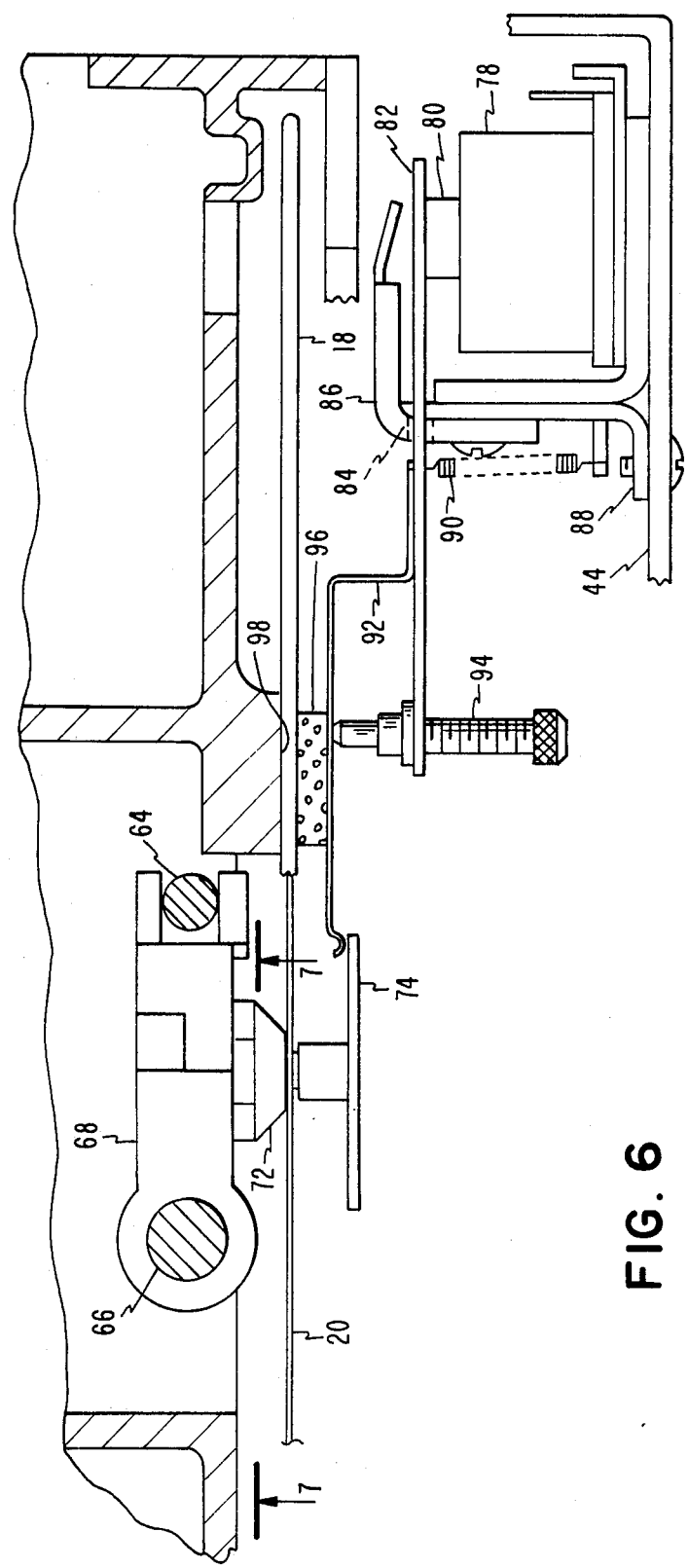
FIG. 6 is a sectional view on an enlarged scale taken on line 6—6 of FIG. 4 with the cover shown in FIG. 5 being assembled on the frame shown in FIG. 4.

The extension 92 is quite elongate compared with the arm 74, and the extension 92 extends beneath the upper end of the arm 74 so that, as the arm 72 travels vertically with the slider 68, the lever extension 92 nevertheless remains beneath the upper end of the arm 74. The lever extension 92 carries a foam rubber pressure member 96 that is located opposite a platen portion 98 of the frame 42, and the pressure member 96 is adapted to clamp the disk assembly 18 between it and the platen portion 98 as is illustrated in FIG. 6.

Figure 7:
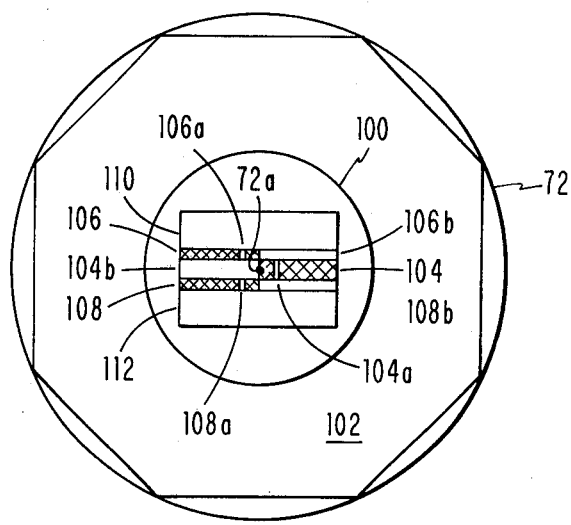
FIG. 7 is a face view on an enlarged scale of a transducer in the disk drive machine and taken on line 7—7 of FIG. 6.

Referring to FIG. 7, the transducer 72 may be seen to have a round central portion 100, which may be flat or slightly spherical, and an outer portion 102 which recedes from the central portion 100. The transducer 72 has substantially the same construction as the transducer disclosed in U.S. Pat. No. 3,846,840 and has a read/write magnetic core 104 with gap 104a and a pair of erase magnetic cores 106 and 108 with gaps 106a and 108a. The cores 104, 106 and 108 are disposed in a stack with the stack being completed by filters 104b, 106b and 108b for the cores. A pair of support plates 110 and 112 are provided on opposite sides of the stacked cores 104, 106 and 108; and the outer surfaces of the plates 110 and 112 and of the cores 104, 106 and 108 and fillers 104a, 106a and 108a all lie in the same plane (or in the same slightly spherical contour) as the rest of the central portion 100 of the transducer 72. The cores 104, 106 and 108 are preferably ferrite which is a ceramic having iron powder impregnated in it and is a relative nonconductor. The plates 110 and 112 and fillers 104b, 106b and 108b are of ceramic material; and the rest of the portion 100 and the portion 102 are of a rigid phenolic material so that transducer 72 as a whole is of electrical insulating material. As is illustrated in FIG. 7, the cores 104, 106 and 108 as an assembly are centrally located in the central region 100 of the transducer 72 and are centered with respect to the center 72a of the transducer 72. It will be understood that suitable electric coils (not shown) are located in the transducer 72 and are in energy transferring relationship with respect to the cores 104, 106 and 108 and with the gaps 104a, 106a and 108a so that the gap 104a is effective for magnetically reading or writing on a magnetic surface of the disk 20 and the gaps 106a and 108a are effective for erasing at the edges of a magnetic track with which the gap 104a is effective.

The machine shown in FIGS. 4–7 functions as follows: With the cover 44 swung open about the studs 46, the collet 52 is spaced with respect to the hub 48; and the disk assembly 18 is dropped into the slots 56 and 58. The disk assembly bottoms on the abutments 62 and in this position has the center of its disk opening 24 aligned with the center of the countersunk opening 50 in the hub 48. The cover 44 is then swung closed, and the tapered portion of the collet 52 enters the opening 50; and the disk 20 is clamped between the hub 48 and the collet 52. The latch 54 is then effective to engage the frame 42 so as to hold the cover 44 closed. It is assumed that the electromagnet 78 is initially de-energized, and the spring 90 is thus effective to hold the lever 82 swung counterclockwise from its position as shown in FIG. 6; and the pressure member 96 is, under these conditions, spaced from the platen portion 98 of the frame 42. Also, the lever extension 92 in this position holds the swinging arm 74 outwardly with respect to the transducer 72. The disk assembly 18 is thus, under these conditions, relatively loose within the slots 56 and 58. The electromagnet 78 is then energized, swivelling the lever 82 about the edges of the opening 84, moving the pressure member 96 toward the platen portion 98 so as to clamp the disk assembly 18 between the pressure member 96 and portion 98. The clamping action of the pressure member 96 is not sufficiently great, however, to prevent rotation of the disk 20 in the jacket 22. This swivelling of the lever extension 92 also causes it to separate from the upper portion of the swing arm 74 so that the spring 76 is effective to cause the arm 74 to bear against the disk 20 and hold it with slight force against the portion 100 of the transducer 72. The motor 49 is in operation so as to rotate the hub 48 and disk 20. The cores 104, 106 and 108 are then in contact with the face of the disk 20 remote from the swing arm 74, and a magnetic reading or writing may take place by means of the gap 104a. The gaps 106a and 108a provide a tunnel erasing action with respect to a track on the disk 20 on which the gap 104a provides a writing action. The motor 70 is used for drivingly rotating the screw 66 for thus moving the slider 68 and thus the transducer 72 toward and away from the center of the hub 48 for causing the transducer 72 to be effective on different concentrate tracks on the disk 20.

As has been previously described, during ordinary usage and handling of the disk assembly 18, such as by moving it into and out of the protective envelope 36, the jacket 22 accumulates an electrostatic charge apparently on its outer surface. If the disk assembly 18 is used in the disk drive machine shown in FIGS. 4–7 (without the skirt 40 being installed in the machine); this electrical charge migrates from the exterior surface of the jacket 22 and accumulates on the transducer 72. After an accumulation of charge on the transducer 72 to a certain high voltage, a transient discharge occurs, probably within the transducer 72 itself. Such discharges occur periodically for a prolonged period of time, such as 15 minutes, until the charge on the jacket 22 has been dissipated. Each such discharge causes an extraneous bit to be sensed by the transducer 72 during reading and prevents the machine of FIGS. 4–7 from being used effectively for this period of time. The charge on the exterior surface of the jacket 22 is retained for this prolonged period due to the fact that the jacket 22 is made of a material which has a very high resistivity. This problem is particularly concerned and prevalent with a transducer 72 of the ferrite type which is of electrically insulating material; and, in fact, the problem can be overcome by using a conventional transducer which is mainly of metal. This is true, because transducers which are made of metal do not allow accumulation of charge on them and rather conduct the charge to ground (the frame 42 of the machine). The ferrite transducer 72, nevertheless, is preferred and is used in connection with the invention, particularly since the ferrite transducer 72 is of relatively low cost and provides a more accurate reading and writing action. The action of the electrostatic charge on the exterior surface of the jacket 22 which disturbs the reading action of the ferrite transducer 72 should be distinguished from any static charge which occurs due to rotation of the disk 20 within the jacket 22. The wipe layer 34 functions to minimize any effects of such static charge as is described in U.S. Pat. No. 3,668,658.

Referring in particular to FIGS. 8 and 9, the skirt 40 is made up of a sheet of thin flexible sheet material such as polyethylene terphthalate (Mylar). One face of the skirt 40 is coated with an electrically conductive layer 114 which may constitute a composition having carbon therein. A strip of tape 116 is disposed along the upper marginal edge of the skirt 40, and the tape is of the type causing adherence with respect to both of its faces. The skirt 40 is provided with a central opening 118 and is also provided with an elongate slot 120 which is located below the opening 118 and is formed by an integral portion 40a of the skirt 40 ringing the slot 120. The skirt 40 has a portion 40b at one side of the slot 120 but is cut out at 40c. The skirt 40 is positioned in the frame 42 as shown in FIGS. 3 and 4 by adhering it onto the inner surface of the frame 42 using the tape 116 which adheres to both one side of the skirt 40 and also to the surface of the frame 42. The tape 116 in particular is adhered to the inner surface of the frame 42 just below the edge 42b of the frame 42 forming the lower boundary of a downwardly slanting surface 42a for guiding the assembly 18 into the recess defined in part by the slots 56 and 58, and skirt 40 hangs downwardly in this recess. The skirt 40 is so positioned that the center 118a of the opening 118 in the skirt is in alignment with the center of the hub 48, and the diameter of the opening 118 is such that its edges are located quite close to the outer edge of the plane portion of the hub 48 in contact with the disk 20 which is indicated in FIG. 8. The opening 118 is round except for an upwardly extending cutout 118b provided to clear certain auxiliary equipment of the disk drive. The longitudinal center 120a of the slot (which is in vertical alignment with the opening center 118a) is in alignment with the center 72a of the transducer 72 as the slider 68 carrying the transducer 72 moves up and down on the slide rod 64. The edges of the elongate opening 120 are spaced quite close to the central portion 100 of the transducer 72 which is that portion of the transducer that makes contact with the disk 20, and this is indicated in FIG. 8 in which the central transducer portion 100 is indicated. The cutout 40c of the skirt 40 provides a clearance for the electromagnet 78 and associated structure, so that the cover 44 carrying the electromagnet 78 and associated structure may be closed into the usual operating position of the cover 44.

The presence of the skirt 40 within the frame 42 has been found to very materially decrease the time during which troublesome discharge takes place in the transducer 72, such as from about 15 minutes to 15 milliseconds. This shortened time of discharge is so short that the electrostatic charge on the exterior of the jacket 22 ceases to be a problem in putting the disk drive machine of FIGS. 4–7 into operation. This is true even though the electrically conducting layer 114 is spaced by the thickness of the skirt 40, particularly the polyethylene terephthalate sheet making up the skirt, from the jacket 22. The electrostatic charge on the exterior surface of the jacket 22 attracts the skirt 40, particularly since the skirt 40 is of thin, flimsy, very flexible material, so that a substantial part of the surface of the skirt 40 facing an exterior surface of the jacket 22 is held in contact with the exterior jacket surface by the electrostatic attraction (see FIG. 3). In particular, the lower portion of the skirt 40 is so held in contact with the jacket, and still more particularly the skirt portion 40a and the portion of the skirt just below the hub 48 are so held in contact with the jacket.

The electrostatic charge which resides on the outer surface of the jacket 22 may be dissipated to the machine frame 42 acting as ground through three general paths, namely, (1) directly to the machine frame 42, (2) through the hub 48 to the machine frame 42 or (3) through the transducer 72 to the machine frame 42.

Charges which flow directly to the machine frame 42 may travel in several branch paths. The most straightforward of these is a branch path including only the outer surface of the jacket 22 from the original position of the charge on the outer surface of the jacket 22 to the nearest grounding point. Parts of the machine frame in direct contact with exterior parts of the jacket 22 represent such grounding points and may be the abutments 62 or the inner surface of the frame 42 forming the slots 56 and 58. Another such branch path and which includes the layer 114 is a branch path in which a charge on the exterior surface of the jacket 22 moves from its original position directly through the polyethylene terephthalate sheet of the skirt 140 into the conductive layer 114. Once in the layer 114, the charge may travel to a grounding point on an inner surface of the frame 42 along edge 42b which is in contact with or is closely adjacent to the conductive layer 114.

Charges which flow to the hub 48 functioning as a grounding point may do so through several branch paths. In one such branch path, a charge travels by conduction on the surface of the jacket 22 to one of the openings 26, 28 or 30 and then travels around the edges of the opening to the recording surface of the disk 20 to the hub 48. The $Fe_2O_3$ coating on the disk 20 may act as a conductor for these charges, particularly since it includes carbon in its makeup providing some conductivity. In another branch path, a charge on the exterior surface of the jacket 22 may flow directly through the material of the jacket 22 through the layer 34 onto the recording surface of the disk 20, and from thence the charge may flow across the $Fe_2O_3$ coating of the disk 20 to the hub 48 as in the previously mentioned branch path. In still another branch path, a charge on the exterior surface of the jacket 22 may flow through the thickness of the skirt 40 onto the conductive layer 114 on the skirt 40, to the opening 118 in the skirt 40, around the edge of the opening 118 onto the recording surface of the disk 20 and from thence to the hub 48. Charges originally lying quite remote from the hub 48 use the last-mentioned branch path to rapidly travel to the hub 48.

Charges which flow to the transducer 72 do so in branch paths which are analogous to those in which charges travel to the hub 48. Such branch paths for the transducer 72 include one in which charges travel on the outer surface of the jacket 22 to one of the openings 26 or 28 in the jacket 22 and then travel through this opening and on the recording surface of the disk 20 to the transducer 72. In a second branch path, a charge may flow through the material of the jacket 22 onto the coating of the disk 20 and from thence to the transducer 72. In a third branch path, charges may flow through the material of the skirt 40, through the conductive layer 114 to the slot 120 and around the edges of the slot 120 and the slot 28 and across the conductive layer of the disk 20 to the transducer 72.

Charges accumulating on the transducer 72 may be sensed by the recording system connected to the transducer 72 as extraneous bits. This extraneous bit sensing is diminished by the action of the conductive layer 114 in the following ways: (1) charge distribution, (2) charge interception, (3) shortened dishcarge times, and (4) reduction of potential differences.

Charge distribution is accomplished by the conductive layer 114 by providing a means in which charges can simultaneously flow to several grounding points at the same time. Since the conductive layer 114 is virtually equipotential, if any point of the layer 114 is grounded (either directly or through the thickness of the skirt 40) all of the outer surface of the jacket 22 on which the skirt 40 lies is similarly grounded. Importantly, the skirt 40 lies on the same side of the jacket 22 as does the transducer 72, and this charge distribution function thus is particularly effective with respect to the transducer 72. This charge distribution function of the conductive layer 114 allows charges from remote parts of the adjacent outer jacket surface to be dissipated by any grounding point, rather than each grounding point only collecting those charges nearby.

In its charge interception (or diversion) function, the conductive layer 114 increases the percentage of the total charge which flows to the frame 42 and hub 48 and lowers the percentage of the charges which flow to the transducer 72 due to the usual laws of current division. This function of the conductive layer 114 is particularly important in reducing the effect of the charge on the exterior surface of the jacket 22 on the transducer 72 when the latter is used in its reading function. Since charge distribution occurs in the conductive layer 114, charges which were formerly collected on the recording surface of the disk 20 in the area of the disk 20 in contact with the transducer 72 are instead conducted away from the vicinity of the transducer 72 to multiple grounding points in parallel paths. For example, a charge on the exterior surface of the jacket 22 and at the edges of the slot 28 receiving the transducer 72 is attracted by the relatively close coextensive edge of the conductive layer 114 at the edge of this slot 28, rather than being attracted to the transducer 72 which is relatively remote compared to this edge of the conductive layer 114.

The conductive layer 114 causes shortened discharge times for charges on the exterior surface of the jacket 22 to occur because the charge decay time for any such charge decreases as the time constant (RC) decreases. (R) and (C) in the expression (RC) are respectively the resistance to ground and the capacitance to ground for any small area of charge on the exterior surface of the jacket 22. The capacitance (C) to ground for any small charged area on the jacket 22 increases as the conductive layer 114 comes into proximate relationship with the charged surface of the jacket 22; however, the total resistance (R) to ground from any small charged area on the jacket 22 is reduced because of the shortening of surface conduction path lengths and because of the paralleling of paths by the conductive layer 114. Even though C increases, R is reduced enough that the decay time for any charge on the exterior surface of the jacket 22 is reduced.

Reduction of potential differences occurs through the following means: Because of the proximity of the conducting layer 114 to the surface charge on the outside of jacket 22 after the skirt 40 has been electrostatically attracted into contact with the jacket 22, capacitance to ground of a small unit of surface area on jacket 22 is increased. For a given charge on any capacitor if the capacitance is increased, the capacitive voltage is decreased. Through this action, jacket surface potential difference to ground is reduced, and in turn, the magnitude of current flow through all of the conducting paths above mentioned is reduced. Most importantly, charge migration toward transducer 72 is reduced.

For the successful operation of the conductive layer 114 as just described, I consider it important that the conductive layer 114 shall have a very low resistance compared to that of the polyvinyl chloride acetate of the jacket 22 and also compared to the $Fe_2O_3$ coating on disk 20. The resistivity of the polyvinyl chloride acetate of the jacket 22 is about $1 \times 10^{15}$ ohms per square; the resistivity of the $Fe_2O_3$ coating on the disk 20 may be between $5 \times 10^9$ and $1 \times 10^6$ ohms per square; and the resistivity of the conductive layer 114 shall preferably be between $5 \times 10^7$ ohms per square and 0 ohms per square. The resistance of the jacket material is thus at least one million times that of the layer 114, although the latter may have appreciable resistance. Incidentally, the thickness of the polyvinyl chloride acetate of the jacket 22 may be 0.010 inch; the thickness of the $Fe_2O_3$ coating on the disk 20 may be 90-120 microinch; and the thickness of the conductive coating of the layer 114 may be less than 0.001 inch and may be 300 to 600 microinch for good flexibility of the layer 114.

It is also considered important that the conductive layer 114 shall cover as much as possible of the surface of the jacket 22 on the side of the jacket 22 that is next to the skirt 40 depending downwardly from just below edge 42b and on the side of the jacket through which the transducer 72 extends so that a large equipotential surface on this exterior surface of the jacket 22 is achieved. Therefore, the skirt 40 is substantially coextensive with this side of the jacket 22 except for the cutout part 40c which is provided for the electromagnet 78, the pressure member 96 and the associated structure. It is also considered important that the conductive layer 114 be coextensive with and completely surround the openings 26 and 28 in the jacket 22 so as to provide equipotential edges around the hub 48 and around the transducer 72, whereby the charges on the exterior surface of the jacket 22 may easily migrate from the outer surface of the jacket 22 around the edges of the openings 118 and 120 in the skirt 40 and into the conductive layer 114.

The conductive layer 114 on the skirt 40 may be the electrically conductive composition described in U.S. Pat. No 3,617,378 and may be in particular that composition mentioned in paragraph 5, lines 6-20 of this patent. In lieu of the composition of U.S. Pat. No. 3,617,378 for forming the conductive layer 114, foils of copper, aluminum, gold and platinum, for example, may be used. Alternately silver particulate paint may be used for forming the layer 114, or the skirt 40 could be metallized with aluminum on one surface. Other materials besides polyvinyl chloride or polyvinyl chloride acetate may be used for the jacket 22 if desired, but polyvinyl chloride acetate is preferred due to a multitude of favorable properties of this material for the jacket.

Other flexible sheet materials may be used for the base material of the skirt 40 instead of the polyethylene terephthalate; however, the base material of the skirt 40 should be very flexible and flimsy and should preferably not be one that takes a permanent set so that the skirt 40 under electrostatic attraction bends and hugs the adjacent surface of the disk assembly 18 and does not acquire surface of the disk assembly 18 and does not acquire creases in it due to usage with many disk assemblies 18 that would prevent its having a good surface contact with all of them. The conductive layer 114 is so thin that it does not acquire permanent creases or sets even if it is of metal. The thickness of the skirt 40 can vary, such as from 0.004 inch to 0.006 inch, for example, with the layer 114 being 0.001 inch thick, for example.

The conductive layer 114 has been described as being on the surface of the skirt 40 which is remote from the adjacent surface of the jacket 22 when the jacket 22 is positioned in place in the slots 56 and 58, bearing on the abutments 62. The conductive layer may instead be provided on the surface of the skirt 40 which is adjacent the jacket 22, and in this case the conductive layer 114 is in direct contact with the jacket 22. In this case, the charges discharging from the jacket 22 pass through the polyethylene terephthalate thickness of the skirt 40 in reaching ground on the frame 42, particularly adjacent edge 42b. Alternately also, conductive layer 114 could be provided on both surfaces of the skirt 40 with the same good results.

Although the skirt 40 has been described as being fixed with respect to the frame 42, and this construction is preferred since the skirt 40 in this case surrounds the slot 28 in the jacket 22 through which the transducer 72 extends, the skirt 40 could instead be fixed with respect to the cover 44 with advantageous results. In this case, the skirt 40 moves into hugging contact with the surface of the jacket 22 opposite to that which is contacted when the skirt 40 is carried by the frame 42 as above described.

I claim:

1. In a disk drive machine for operating on a disk-jacket assembly in which the jacket encloses the disk and is made of a material with high electrical resistivity so that the jacket may accumulate a high electrostatic charge on it, said jacket having a central opening through it and having an elongate slot in one of its thicknesses, said disk drive machine comprising:
    a frame having a vertical recess in it into which the disk-jacket assembly may be dropped,
    a rotatable hub carried by said frame and adapted to have an engagement with the disk of said disk-jacket assembly through the central opening of the jacket for driving the disk,
    a transducer of substantially electrically insulating material adapted to extend through the elongate slot of said disk-jacket assembly so as to have a data transferring relationship with respect to the disk, and
    a skirt fixed at the upper end of said recess and depending downwardly into said recess and being of such flexible, flimsy thin sheet material so that the skirt is attracted to and thus moves into contact with an adjacent outer surface of the disk-jacket assembly positioned in said recess due to the electrostatic charge on the jacket, said skirt being made at least partially of electrically conducting material so that the electrostatic charge on the jacket may flow through the electrically conducting material of the skirt to said frame for dissipating the electrostatic charge on the jacket to the frame.

2. A disk drive machine as set forth in claim 1, said skirt being composed of a base layer of an electrically insulating material and said electrically conducting material constituting a layer disposed on said base layer.

3. A disk drive machine as set forth in claim 1, said skirt being on the same side of said recess as said transducer and having an elongate opening therein which is substantially coextensive with the elongate slot in said jacket through which said transducer extends.

4. A disk drive machine as set forth in claim 1, said skirt being on the same side of said recess as said hub and having an opening therethrough which closely surrounds said hub for a major portion of the circumference of the hub.

* * * * *